United States Patent [19]
Spitz

[11] Patent Number: 6,000,615
[45] Date of Patent: Dec. 14, 1999

[54] METHODS FOR SCANNING A SUCCESSION OF BAR CODE SYMBOLS

[75] Inventor: Glenn Steven Spitz, Northport, N.Y.

[73] Assignee: Webscan, Inc., Brentwood, N.Y.

[21] Appl. No.: 08/957,846

[22] Filed: Oct. 27, 1997

Related U.S. Application Data

[63] Continuation-in-part of application No. 08/584,242, Jan. 11, 1996, Pat. No. 5,729,001.
[51] Int. Cl.$^6$ ....................................................... G06K 7/10
[52] U.S. Cl. ....................................... 235/462.01; 235/432
[58] Field of Search ........................ 235/462.01, 462.02, 235/462.09, 462.1, 462.13, 462.25, 462.32, 462.2, 462.21, 462.22, 436, 432

[56] References Cited

U.S. PATENT DOCUMENTS

| | | | |
|---|---|---|---|
| 4,251,798 | 2/1981 | Swartz et al. | 340/146 |
| 4,387,297 | 6/1983 | Swartz et al. | 235/462 |
| 4,705,939 | 11/1987 | Ulinski, Sr. | 235/466 |
| 5,019,714 | 5/1991 | Knowles | 250/568 |
| 5,051,567 | 9/1991 | Tedesco | 235/462 |
| 5,080,456 | 1/1992 | Katz et al. | 359/214 |
| 5,194,720 | 3/1993 | Reinnagel et al. | 235/437 |
| 5,218,190 | 6/1993 | Hardesty et al. | 235/462 |
| 5,260,553 | 11/1993 | Rockstein et al. | 235/462 |
| 5,272,322 | 12/1993 | Nishida et al. | 235/462 |
| 5,317,166 | 5/1994 | Tafoya | 250/568 |
| 5,324,924 | 6/1994 | Cai et al. | 235/463 |
| 5,528,022 | 6/1996 | Nakazawa | 235/436 |

OTHER PUBLICATIONS

Uniform Code Council, "Quality Specification for the UPC Printed Symbol" (Appendices *not* submitted due to length), Sep. 1994.

*Primary Examiner*—Thien Minh Le
*Attorney, Agent, or Firm*—Island Patent Associates

[57] ABSTRACT

A method to collect and group a plurality of scans for respective bar code symbols of a succession of spaced bar code symbols. The symbols are disposed on a continuous substrate moving past a scanner unit arranged to scan a plurality of the spaced symbols, one after the other. The method of the invention provides for the energizing and de-energizing of a scanner unit in order to scan the substrate in a controlled manner so as to ensure the scanner unit is operating and scanning when each respective bar code symbol, to be scanned, is within the field of view of the scanner unit. The detecting of the presence of a bar code symbol within the field of view of the scanner unit is realized by scanning the symbol and determining a valid decode. Once a valid decode is determined, a plurality of subsequent scans associated with the bar code symbol are collected and grouped, and further may be processed to determine at least one evaluation attribute for each scanned symbol. After a predefined temporal period has elapsed, or alternately, a predetermined number of scans has occurred (for a respective symbol), the scanning is stopped with the scanner unit de-energized in accordance with the controlled manner. The method is then repeated for a plurality of the bar code symbols disposed on the moving substrate.

29 Claims, 7 Drawing Sheets

METHODS FOR SCANNING A SUCCESSION OF BAR CODE SYMBOLS

CROSS REFERENCE TO RELATED APPLICATION

The subject matter provided herein represents a continuation-in-part of Ser. No. 08/584,242 filed on Jan. 11, 1996, which now is U.S. Pat. No. 5,729,001, which issued on Mar. 17, 1998, and is hereby incorporated by reference.

BACKGROUND OF THE INVENTION

1. Field of the Invention

The present invention relates to methods that are useful for scanning and evaluating a continuous succession of bar code symbols. more particularly, the invention provides methods supporting the collecting and grouping of a plurality of scans for each respective bar code symbol in a succession of bar code symbols passing a scanner unit that is cycled on and off in a controlled manner.

2. Description of the Prior Art

A long standing need to verify and or evaluate the printed quality of bar code symbols is well known in the art. With the ubiquitous bar code symbol now used by virtually all inventory intensive establishments, such as warehouses and retail stores, methods to support the high speed evaluation and verification of bar code symbols, especially a succession of bar code symbols disposed on a moving substrate, are needed.

There are many hand held and fixed position bar code verifiers known in the art. Hand held systems enable a user to manually position a scanner unit to scan different portions of the symbol being verified. An analysis may then be conducted by the verifier to determine various evaluation parameters. These devices, and their methods of operation, are generally capable of evaluating and verifying individual bar code symbols in a manual manner. Hand held verifiers may be categorized into two fundamental groups of scanning verifies: contact verifiers and non-contact verifiers. Contact verifiers are physically placed in contact with the substrate on which the symbol is printed. Non-contact verifiers are generally scanner based apparatus, wherein the scanner is positioned at a fixed distance from the bar code symbol being evaluated. These systems are often manually operated to scan selected portions of a single symbol to be evaluated.

Some non-contact verifying systems known in the art are configured to be mounted on bar code printers. These systems evaluate the quality of a bar code symbol as it is printed in an on-demand and synchronous manner. If the quality of the just printed symbol is determined to be below a pre-selected level, the printer can be stopped. In these systems, a significant amount of communication and connection is provided between the printing mechanism and the verifier. The fact that the paper advance means and the print head of the printing mechanism are under the control of a computer means, which also controls the verifier mechanism, greatly simplifies the starting and stopping of the scanning and verifying of each newly printed symbol. That is, the communication and connection between the printer and the verifier determines when the evaluation is to start. Thus, the location of the symbol is well established with this method of verification. In contrast, on high speed flexographic printing presses and the like, which are generally mechanical rather than electronic in nature, the exact location of the bar code symbols to be evaluated is not readily known. Further, often the bar code symbol to be evaluated and verified is disposed around other printed information, possibly making evaluation more difficult.

There is currently a need to have high speed verifier arrangements (with associated methods of operation) for use in demanding applications wherein a succession of bar code symbols must be rapidly evaluated in an automated fashion. For example, skilled persons will appreciate the considerable difficulty of evaluating bar code symbols being rapidly printed on a printing press. Especially, where the apparatus does not advance the paper substrate in sync with the verifier activities (i.e., the printing and verification are asynchronous processes), and the evaluation must determine a count of the number of symbols printed, verify decode and a variety of other well known evaluation attributes for each symbol (by processing a 'distinct group' of scans taken of the symbol). Also, a system must suitably deliver the evaluation information to an operator or a monitoring system. It should be understood that the terms 'processing' and 'process', when referring to scans taken of a bar code symbol, are defined as determining if the bar code symbol is decodable and further may include determining one or more evaluation attributes.

There is also a current need to evaluate in an automated fashion a succession of bar code symbols disposed on repeating regions, or in repeating images, on a substrate. A particular need would be satisfied by an apparatus that could evaluate a succession bar code symbols in (near) real-time and provide an immediate indication of the quality of each symbol. Such evaluation allows for the immediate response should a problem be detected in the quality of the symbols being applied to a substrate (e.g., being printed on a printing press). At a point in time were the symbols being applied are found to be of low quality, the printing press may be stopped and the cause of the problem ascertained and corrected. The press may then be restarted with little loss of material and the virtual elimination of the need to reprint and replace poorly printed bar code symbols.

At present, there are a variety of well known guidelines and standards used to quantitatively evaluate the quality of bar code symbols. A quality evaluation guideline published in September 1994 by the Uniform Code Council (UCC), is titled "Quality Specification for the UPC Printed Symbol". This document, which is hereby incorporated by reference, presents an overall methodology for printing and verifying the common Universal Product Code, UPC, symbol. In particular, parts 2 and 3 of the UCC document provide definitions and related subject matter for a number of evaluation attributes. The evaluation attributes, which are also known as SRP parameters, and very generally as figures of merit, may be determined and combined to indicate the relative quality of the evaluated symbol. The term 'relative quality' can be assumed to be the quality of a bar code symbol with respect the level of quality established by well known standards and guidelines known to skilled persons.

With the advent of rigorous and well defined quantitative measures to evaluate bar code symbols, there is a need for improved methods to support high speed automated evaluation and verification, particularly where real-time evaluation is desired. Current standard evaluation guidelines, such as the UCC quality specification, call for a plurality of scans spaced along the height of the symbol to be collected and evaluated. The results of the processing of the individual scans must then be combined to determine a measure of quality indicative of the overall quality of the symbol. Whereas, this requirement can be manually satisfied with hand-held verifiers as discussed above, and with on-demand printers which control and coordinate the printing, scanning, and processing of symbols to be evaluated, there is an unaddressed need for arrangements and methods to enable the collecting and grouping of scans that are associated with, and correspond to, each individual bar code symbol in a succession of spaced bar code symbols.

Objects and or advantages of the present invention are, therefore, to provide new and improved methods to support the scanning of a succession of bar code symbols, especially to collect and group a plurality of scans for each scanned symbol, having one or more of the following, capabilities, features, and/or characteristics:

- automated high speed detecting and scanning of each of a succession of bar code symbols;
- enables the collecting and grouping a plurality of scans associated with each scanned symbol;
- asynchronous delimitation between individual bar code symbols (with no supporting and specific 'detection means' or additional structure;
- scanning conducted in a controlled manner with the scanner unit suitably cycled on and off (i.e. energized and de-energized);
- useful to extend the life cycle of scanner units via operation in the controlled manner;
- enables the collecting and accurate grouping of scans associated with respective symbols (of the succession of symbols) being evaluated);
- rapid determination of the quality of each symbol in a succession of bar code symbols; and
- employable to determine and indicate trends of increasing or decreasing quality of bar code symbols.

SUMMARY OF THE INVENTION

In accordance with the invention, methods are disclosed to collect and group a plurality of scans associated with each respective bar code symbol in a succession of spaced bar code symbols. The symbols are disposed on a substrate moving past a scanner unit that is arranged to scan the substrate in a controlled manner so as to ensure the scanner unit is operating and scanning when each respective bar code symbol enters the field of view of the scanner unit. The detecting of the presence of a bar code symbol moving into the field of view of the scanner unit is realized by scanning the symbol and determining a valid decode. Once a valid decode is determined, the first decoded scan and or a plurality of subsequent (possibly decodable and non-decodable) scans associated with the bar code symbol are collected, grouped, and possibly processed to determine at least one evaluation attribute for each scan collected. Once a predefined temporal period has elapsed, or alternately, a predetermined number of scans has occurred (for a respective symbol), the scanning is stopped by de-energizing the scanner unit in accordance with the controlled manner. The method is then repeated for a plurality of the bar code symbols disposed on the moving substrate. Additional steps may be included to detect regions of the moving substrate wherein bar code symbols are known to be disposed and maintaining counts of both the number of regions detected and the number of bar code symbols scanned. The collecting, grouping and processing of the scans associated with each symbol, and the statistical and evaluation related information determined therefrom, are useful to monitor the quality and quality trends of the bar code symbols of the succession.

BRIEF DESCRIPTION OF THE DRAWINGS

In the drawings, like elements are assigned like reference numerals. The drawings are not necessarily to scale, with the emphasis instead placed upon the principles of the present invention. The drawings are briefly described as follows.

LIST OF REFERENCE NUMERALS USED IN THE DRAWINGS

10—bar code symbol (enlarged)
12—scan reflectance profile (SRP) signal
14—laser beam spot
20—substrate
22a—bar code symbol
22b—bar code symbol
22c—bar code symbol
24—portion or region of substrate 20
26—scan line (or present scanning position)
30—eye mark
32—indexing notch
50—time line

DETAILED DESCRIPTION OF THE INVENTION

It is important to establish the definition of a number of terms and expressions that will be used throughout this disclosure. Bar code verification systems of the type for which the method of the present invention apply, scan a bar code symbol and produce an analog signal known as a scan reflectance profile signal, or simply an SRP signal. The SRP signal, which is representative of the elements composing the bar code symbol, may be processed to decode and generally evaluate and verify the quality of the scanned bar code symbol. The term 'scan', which is well known in the art, may be defined as an attempt to read a symbol, typically by employing a suitable scanner unit to generate a scan reflectance profile signal that represents the encoded data of the bar code symbol. Often, SRP signals are digitized, typically by employing devices such as analog-to-digital converters, and the like, to produce a plurality of data values (samples) that may be stored in a suitable memory structure. Accordingly, the 'collecting' of scans for a respective bar code symbol may result in a plurality of data values being stored and or processed, wherein an overall plurality of data values may include a plurality of sub-groupings (of data values) produced by each scan of the symbol. It must also be understood that the expression 'a succession of spaced bar code symbols' may be assumed to indicate each and every symbol, say, disposed on a moving (possibly continuous) substrate, or alternately, every other bar code symbol, or even every fifth bar code symbol. Accordingly, the scanning of the succession of bar code symbols moving past a bar code scanner may actually involve the scanning and evaluating of less than the total number of bar code symbols disposed on said substrate and passing the scanner unit. The expression 'scanning in a controlled manner' will be defined as pertaining to the energizing and de-energizing (starting and stopping) of the employed scanner unit (or equivalently the laser source contained therein) so as to ensure the scanner unit is operating and scanning when a respective bar code symbol (to be evaluated) enters the field of view of the scanner unit. The 'controlled manner of scanning' will result, therefore, in the scanner being energized and scanning while 'waiting' for a bar code symbol to move into position to be scanned. The scanner unit will then scan, according to the controlled manner, until a predefined temporal period has elapsed, or until a predetermined number of decodable and non-decodable scans are collected (and possibly processed). The scanner units is then de-energized. The duration for which the scanner unit is off or de-energized will be established in one of a number of ways. A preferred approach would be to simply monitor when a second temporal period has elapsed, and restart the scanner at that time. Other suitable arrangements and means, to ensure the scanner is again energized before the bar code symbol reaches the scanner unit, will be fully addressed below. In addition, further discussions defining and employing the expression 'scanning . . . in a controlled manner' will be provided below as needed. Finally, the terms, 'symbol', 'bar code', and 'bar code symbol', and other equivalent terms will be defined as any machine readable indicia comprised of a plurality of elements of varying and discernible reflectivity.

It is also important to understand that for the methods disclosed and claimed, the scanner unit may initially be energized and continuously scanning until one or more bar code indicia are scanned. The scanner unit may then be cycled off and on in accordance with the controlled manner of scanning of the present invention.

Figure 1:
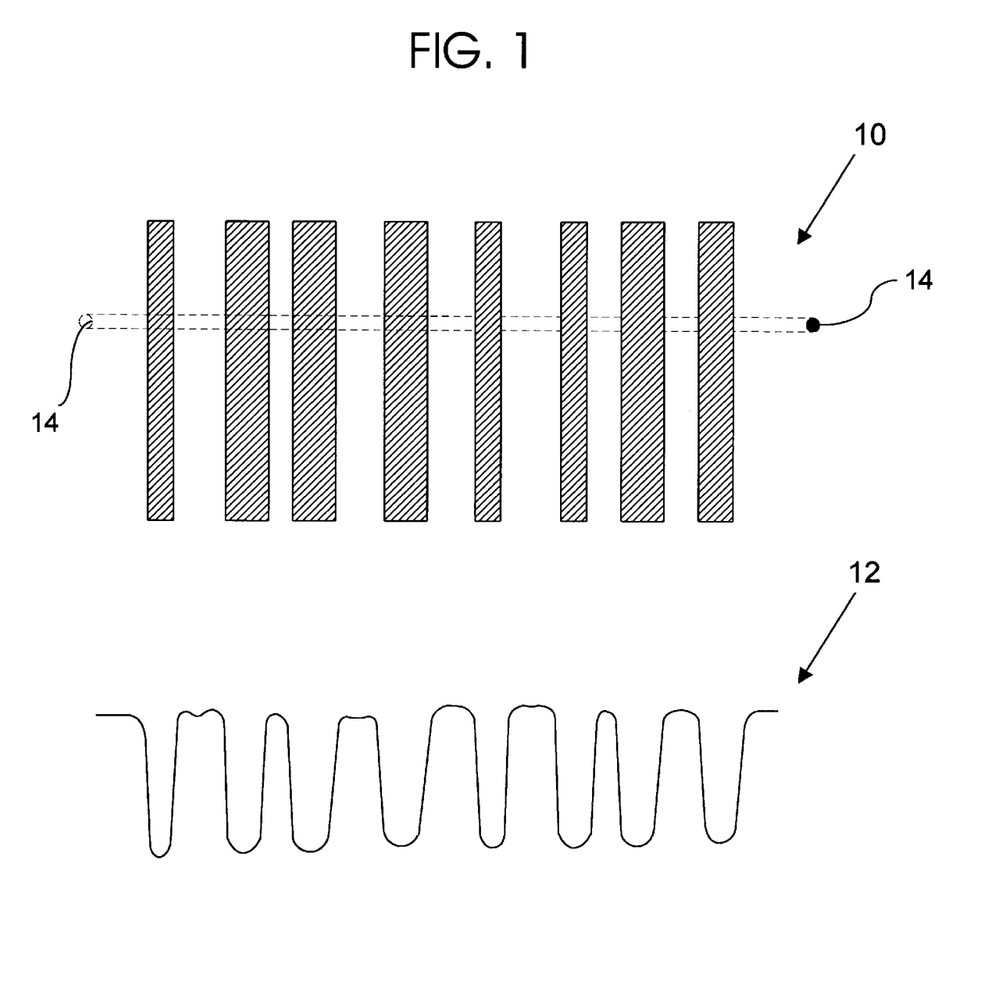
FIG. 1 illustrates an enlarged view of a bar code symbol and a corresponding scan reflectance profile (SRP) signal generated by scanning the bar code symbol with a scanner unit.

Referring to FIG. 1, there is illustrated an enlarged view of a portion of a bar code symbol 10, along with a corresponding scan reflectance profile (SRP) signal 12. The SRP is generated by a suitable scanner unit sweeping a laser beam spot 14 at nearly constant velocity across the bar code symbol 10 (from left to right as shown). The scanner unit then senses the amount of reflected light transmitted back from the elements of the symbol 10 to generate the SRP signal 12. The SRP signal 12 may then be processed, using either digital or analog techniques, to evaluate the quality of the associated bar code symbol 10. The generation and processing of scan reflectance profile signals is well known in the art, with many suitable apparatus and methods available. For example, an SRP may be sampled, by a device such as an analog-to-digital converter, to produce a collection of sample values representative of the bar code symbol scanned. The entire collection of sample values (or a subset of filtered sample values required to evaluate the bar code) may then be utilized to determine various evaluation attributes indicative of the quality of the scanned bar code symbol.

In order to provide for the 'overall' evaluation of a bar code symbol, a succession of scans are made at somewhat equally spaced locations within an inspection band along the height of the elements composing the bar code symbol. Often each scan of the symbol is processed to assign a measure of quality to one or more of the evaluation attributes determined (by processing the scan). The measures of quality for each attribute determined for a scan may then be combined to determine a single measure of quality for that scan. Then, the measures of quality for each scan are often combined to determine an overall measure of quality for symbol. The overall measure of quality of the symbol being indicative of the overall relative 'quality' of the evaluated symbol. For example, the UCC quality specification defines a number of evaluation attributes (SRP parameters) that may be employed to quantitatively score each processed SRP of a scanned bar code. The evaluation attributes include symbol contrast (SC), edge contrast (EC), modulation, etc. Each attribute may be determined by a proper analysis of the scan reflectance profile and assigned a measure of quality. The UCC specification then calls for the assigning of a measure of quality to that scan which is equal to the lowest measure of quality determined for the evaluation attributes considered (for that scan). When a number of scans have been processed and assigned measures of quality, an overall measure of quality for the entire bar code symbol may be determined by combining (averaged in the case of the UCC approach) the measures of quality assigned to each individual scan of the symbol. The overall measure of quality for the entire bar code symbol is therefore a function of a number of scans taken over some portion of the height of the symbol and indicative of the relative quality of the scanned symbol.

In addition to defining the above listed evaluation attributes, the UCC quality specification, as well as other known standards, provide for the assigning of weighted values to facilitate the communication of the level of quality determined. For example, the UCC specification uses a predetermined plurality of weighted values equivalent to an academic grading system. The UCC plurality of weighted values are A, B, C, D, and F; wherein 'A' is the highest quality possible and 'F' is an unacceptable quality level. This approach and others known to skilled persons enables an unskilled operator to quickly identify the quality of one or more bar code symbols.

Figure 2A:
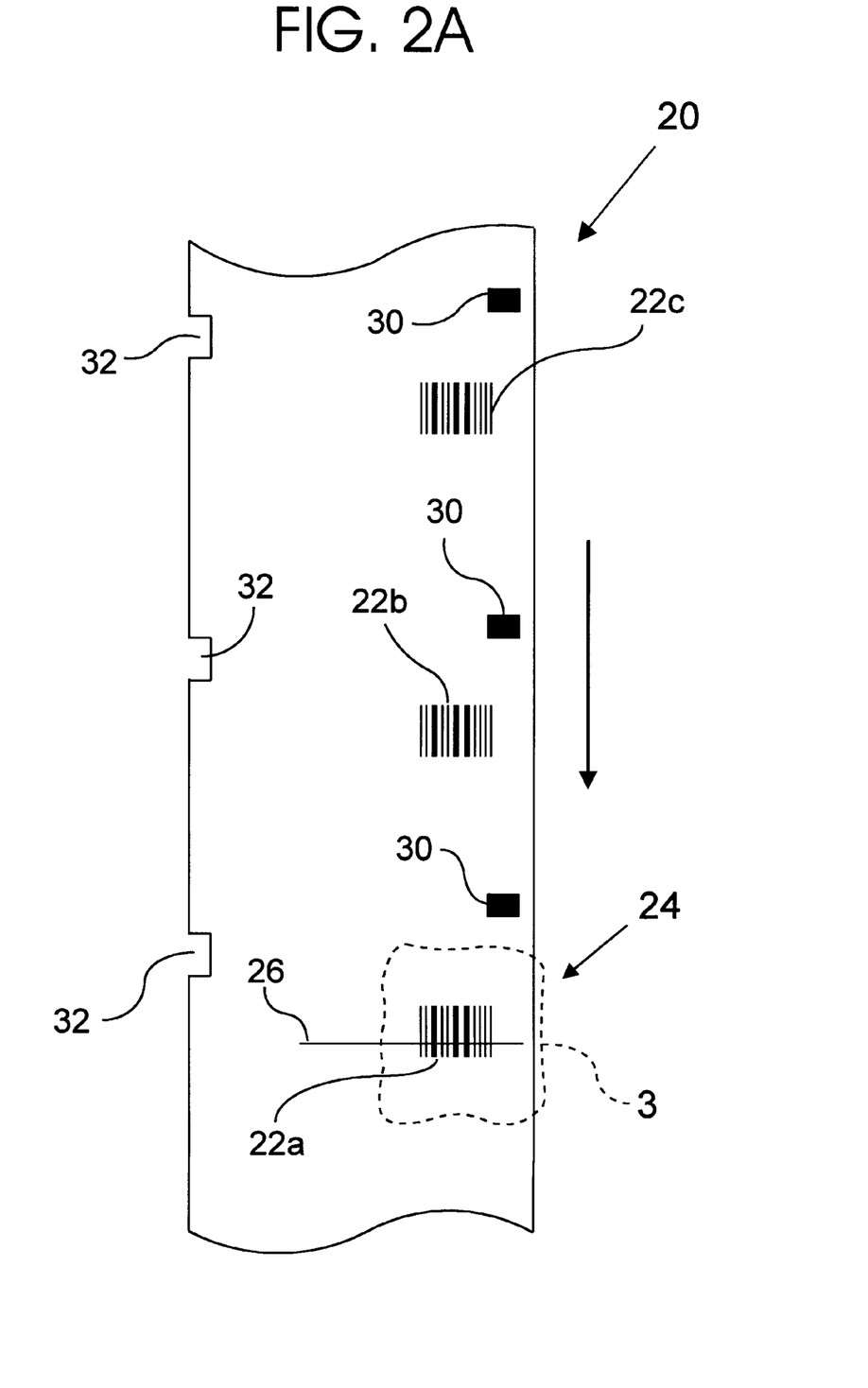
FIG. 2A depicts a moving substrate with a succession of bar code symbols disposed thereon.
Figure 2B:
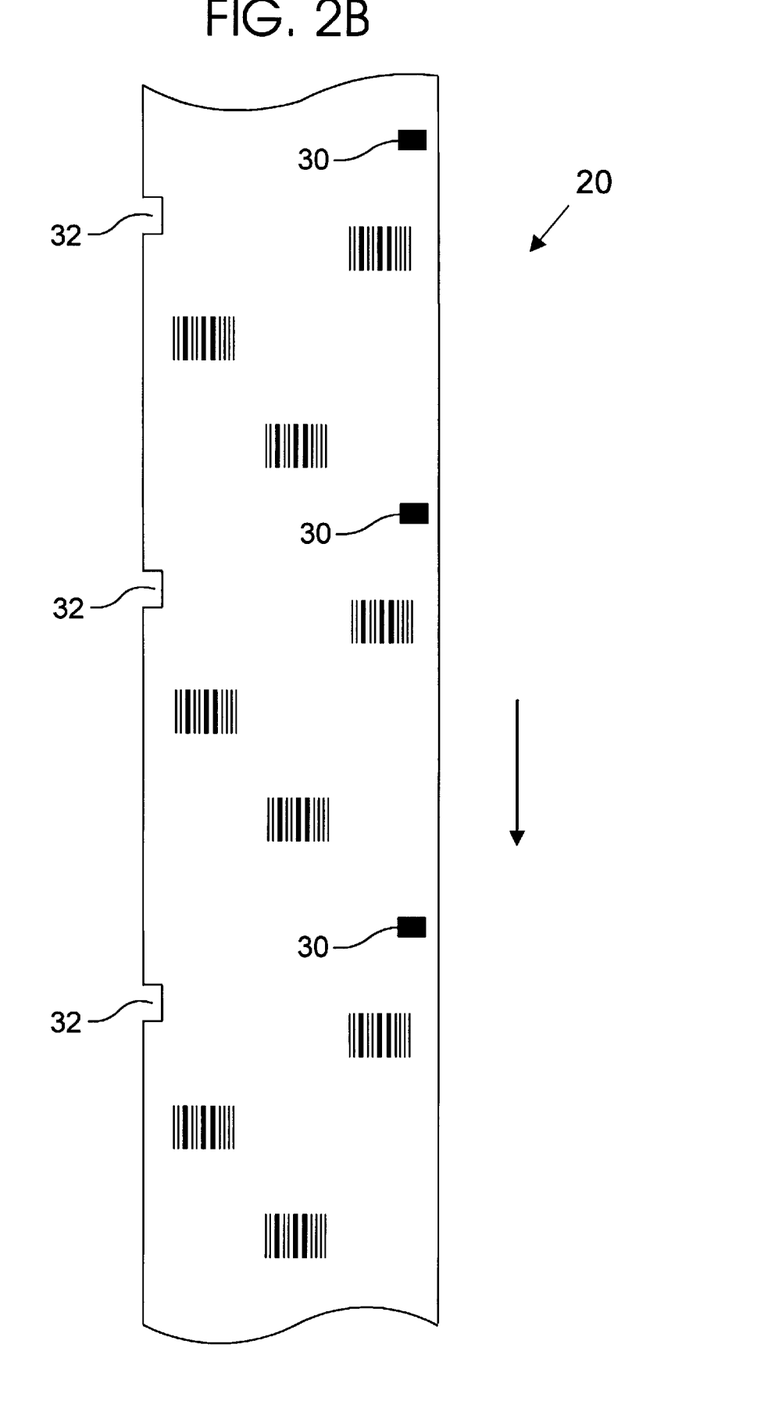
FIG. 2B depicts another arrangement of spaced bar code symbols disposed on a moving substrate.

Referring now to FIG. 2A, there is depicted a moving and continuous substrate 20 (which may be equivalently provided by a succession of continuously feed, single sheets) with a succession of bar code symbols 22a, 22b and 22c, disposed thereon. As shown, the exemplary motion of the substrate 20 is down towards the bottom of FIG. 2A. It should be noted that other printed images may also be disposed on the substrate (and in a field of view of a suitably positioned scanner unit). As the substrate moves along a predetermined path, the symbols disposed thereon are moved past a scanner unit arranged to scan respective symbols of the succession (of symbols), one after the other. Typically, it is required that the scanner unit scan a symbol a plurality of times, therefore, providing a plurality of scans taken over at least a portion of the height of the symbol. The point or location where the scanning occurs will be defined as a scan line location, having a corresponding scan line such as scan line 26, as shown in FIG. 2A. A skilled person can appreciate the considerable difficulty posed by the fact that a scanner unit 'sees' a narrow one-dimensional slice of substrate 20 with each scan. Moreover, as the substrate 20 is moving in an asynchronous manner with respect to the scans made by the scanner unit, some scans will be on a bar code symbol, while others will occur partially on, or between bar code symbols. It is an object of the present invention to energize and de-energize the scanner unit (for example, by enabling and disabling a laser light source of a laser type scanning unit), to realize a number of known benefits including minimizing power consumption, extending the useful life of the laser source, safety considerations, etc., and to ensure that scanning occurs at appropriate times such as before, during, and possibly after, a respective bar code symbol passes the scanner and through its associated field of view. The scanning of the bar code symbol located upon the moving substrate typically results in the collecting, grouping, and processing of a number of scans (typically via the plurality of SRP signals generated by the scanner unit) and evaluating the relative quality of the symbol scanned. The process is repeated for a plurality of the bar code symbols in the succession. It should be noted, as illustrated in FIG. 2B, that the present invention may be employed with a staggered or non-linear succession of bar code symbols. Also, the present invention may be employed with additional scanner units, possibly operating in parallel, to provide for the complete 'coverage' of a large substrate or a plurality of nearby substrates.

Figure 3:
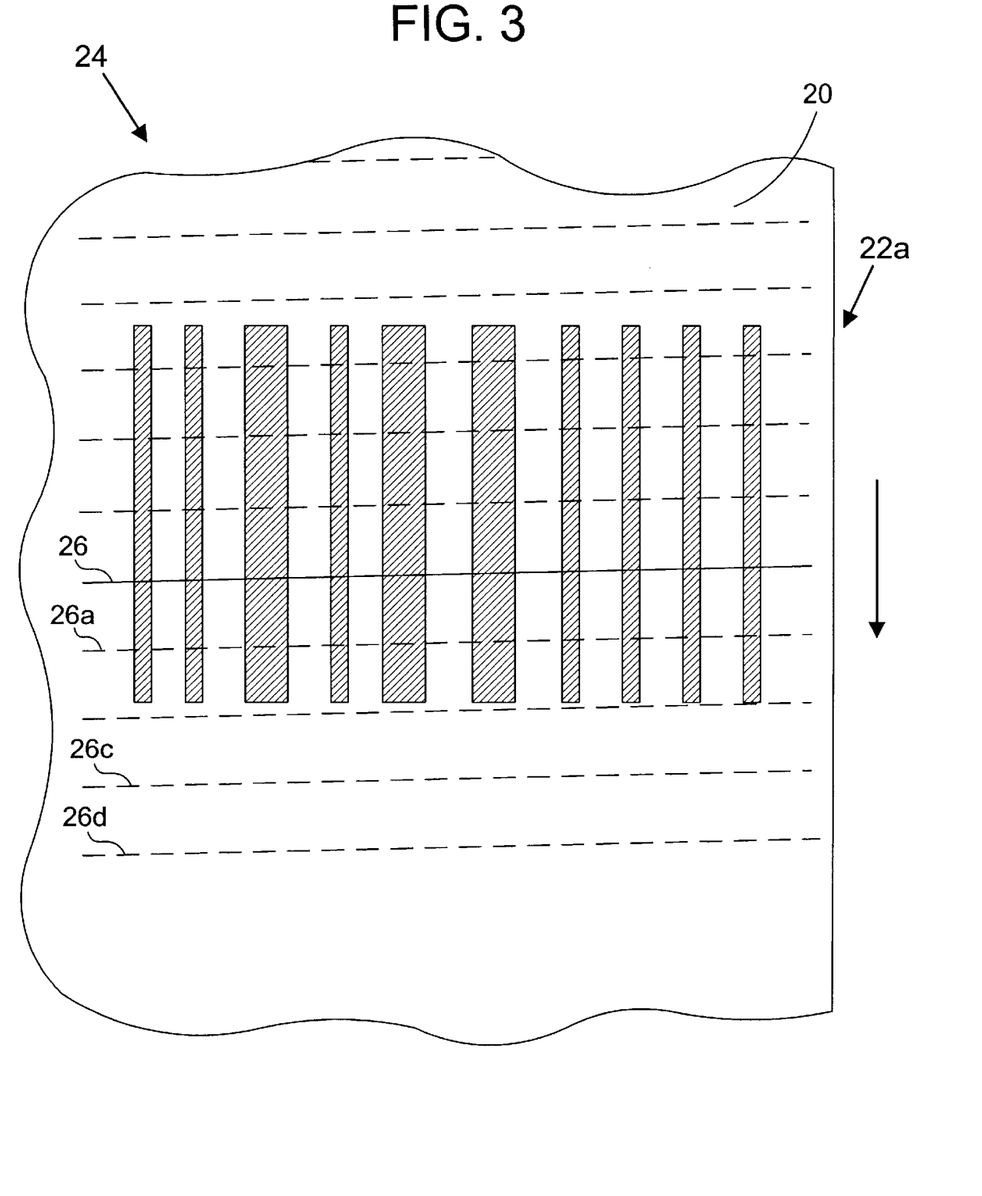
FIG. 3 is an enlarged view of a portion of the substrate shown in FIG. 2A with a bar code symbol disposed therein.

Reference will now be made to FIG. 3, which illustrates an enlarged portion 24 of the substrate 20 of FIG. 2A, to clearly define operational characteristics of several of the embodiments of the method of the present invention. As can be seen in FIG. 3, a scanner unit may be energized at an appropriate point in time, so that the scanner unit is scanning before, or just after, the bar code symbol 22a enters the field of view of the scanner. Accordingly, a first scan line 26d may occur. The scan reflectance profile (SRP) for scan line 26d would be processed and found to be non-decodable. If not decodable, an assumption is made that a bar code symbol was not scanned (i.e., is not within the scanner's field of view). The following scan line 26c represents a possible location on the moving substrate 20 of the next scan line. Again, the associated SRP would be processed and found to be non-decodable. Eventually, a scan is made at scan location 26a, the SRP signal is processed, and a valid decode is determined. The method has thereby determined the presence of the bar code symbol 22a in the field of view of the scanner unit using the scan location (on the substrate 20) corresponding to scan line 26a. As a function of the rate at which the substrate moves, typically expressed in feet/minute, and the rate at which scans are made, many scans of the actual bar code symbol may be taken and processed. As shown in FIG. 3 the current position of the scan line is scan 26. For a bar code symbol having at least a fair measure of quality, one skilled in the art would recognize that there is a good likelihood that scan line 26a and several other subsequent scan lines would produce valid decodes.

It must be understood that the scanning of a respective bar code of the succession may commence when a first portion (i.e. the bottom portion as illustrated in FIG. 3) of the bar code symbol is within the field of view of the scanner unit. In a most preferred embodiment of the invention, the location (or time) at which scanning is commenced will be just before the symbol enters the field of view of the bar code symbol, or possibly at the very bottom portion of the bar code symbol, so as to minimize the number of non-decodable scans that occur before the symbol is actually scanned and a valid decode determined.

Scanning of the bar code symbol 22a of FIG. 3 would continue thereby providing a plurality of SRP signals along the height of the bar code symbol. The SRP signals may then be grouped (and associated with the scanned indicia) and analyzed to determine the overall measure of quality of the bar code symbol 22a scanned. At some point in time the symbol 22a leaves the field of view of the scanner unit. If scanning continues, a subsequent group of scans processed would be found to be non-decodable. The scanner may then be de-energized in accordance with the controlled manner of scanning, as a result the non-decodable scans, or alternately, scanning may be halted or suspended with the occurrence of one of a number of events, with scanning resumed at some subsequent and appropriate time in order to appropriately scan the next respective symbol of interest. As an example, once scanning has commenced, the scanning may continue for a first predefined temporal period after the first valid decode is detected, thereby resulting in the collection and grouping a plurality of SRP signals for the scanned symbol. The scanner may then be de-energized. Alternately, the scanning of the symbol may continue until a predetermined plurality of scans (possibly decodable and non-decodable) have occurred, or the predetermined number of consecutive non-decodable scans have occurred. If the predetermined number of consecutive non-decodable scans have been processed, the method of the invention would typically assume the end of the bar code symbol being scanned has been reached. That is, with the occurrence of a preselected number of consecutive non-decodable scans, for example, 5 non-decodable scans, the region of the substrate 20 with the bar code symbol 22a disposed therein may be assumed to have moved past the scanner unit, and the scanner unit may be de-energized. Scanning would then be appropriately re-commenced, and the process would then repeat wherein the presence of the next bar code symbol (in the succession of bar code symbols) detected in the field of view of the scanner unit by a determining a valid decode. The next bar code would then be scanned with a plurality of scans collected and grouped.

Figure 4:
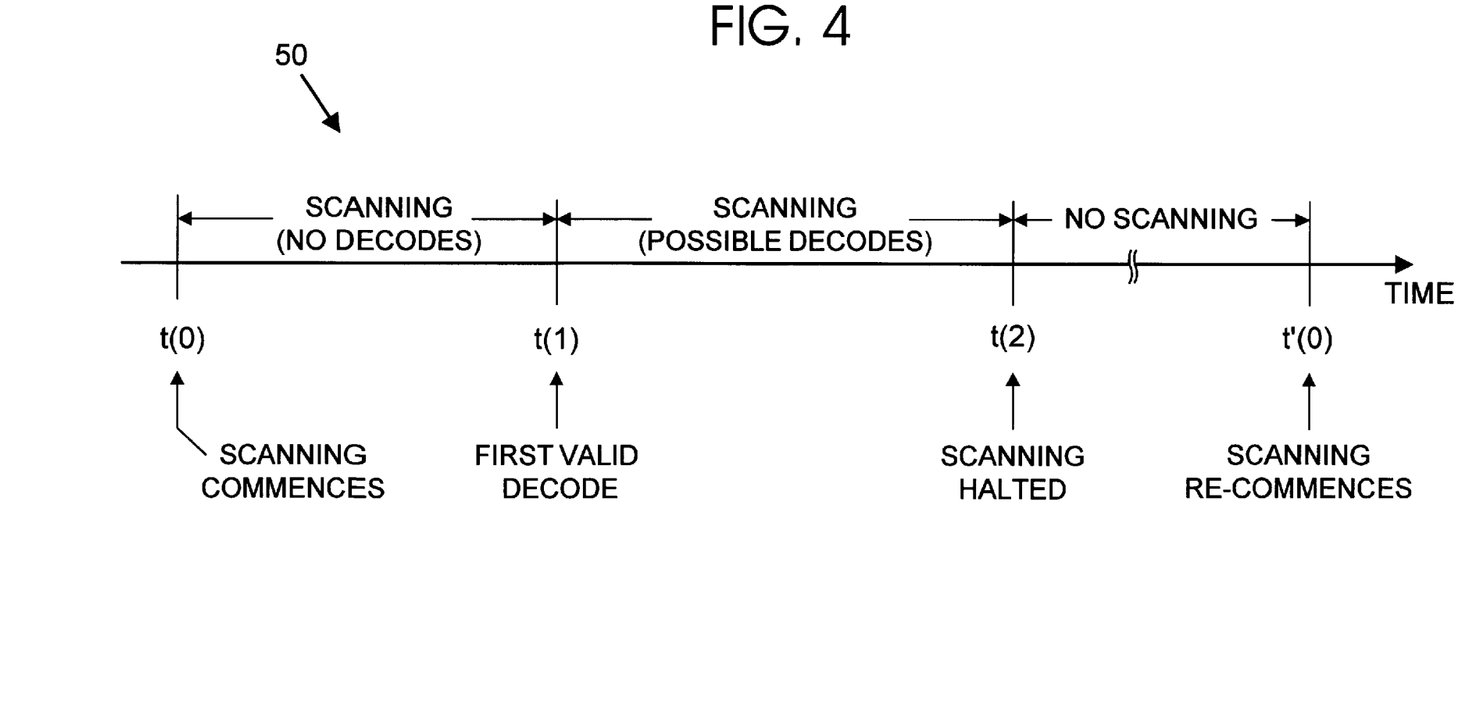
FIG. 4 is a time line depicting the energizing and de-energizing of a scanner unit in accordance with the controlled manner of scanning.

A preferred embodiment of the method of the present invention may be best understood with reference to FIG. 4. It should be understood that in accordance with an important feature of the invention, the scanning of a symbol will always commence and result in a plurality of scans being collected and grouped, and associated with the scanned symbol. Scanning will generally be stopped or terminated for a given temporal period, and subsequently commence in order to scan (typically many times) the next respective symbol to be evaluated/considered. As can be seen in FIG. 4, a time line 50 is provided. Scanning commences at a point in time, t(0), which may preferably be just before the symbol has entered the field of view of the scanner, or very soon thereafter (to enable a plurality of scans to be collected). It may be noted that the term 'just before', may be assumed to indicate that scanning will generally commence and several scans, say, between one and ten, will be attempted before a valid decode is determined. Accordingly, at time t(1), possibly after a number of scans have occurred, the first valid decode is determined and the symbol may now be assumed to be 'visible' to the scanner unit. Scanning continues from time t(1) to time t(2), with a plurality of scans (e.g., as provided via SRP signals) collected and grouped. As previously indicated, scanning may halt at time t(2) due to one of a number of possible events. Contemplated events include the occurrence of a predetermined number of consecutive non-decodable scans, a predetermined number of consecutive decodable scans, a predetermined total number of decodable and non-decodable scans, or the expiration of a predefined temporal period, etc. As shown in FIG. 4, from the time t(2) until the scanning re-commences at time t'(0) of the next cycle, the scanner is de-energized and not scanning. The process described in FIG. 4 may be repeated for the succession of bar code symbols disposed on the substrate.

Those skilled in the art will recognize that it may be required or advantagous, when considering the methods disclosed and claimed herein, to initially energize the scanner unit and continuously scan the substrate until a first bar code indicia is scanned. The scanner unit may then be cycled off and on in accordance with the controlled manner of scanning of the present invention from that point on. It should also be noted that the distance between the spaced bar code symbols, as shown in FIGS. 2A and 2B, is intended to be illustrative only. The distance between actual bar codes may be greater than or less than that illustrated. A limiting consideration for the minimal distance supported by the method of the invention is the distance required to determine (collect and group) the required number of scans, and de-energize and re-energize the scanner unit, before the next bar code symbols enters the field of view of the scanner unit. Further, in especially demanding circumstances wherein the bar code symbols are located in very close proximity, the controlled manner of scanning may result in the scanner unit being effectively on full time and continuously operating.

Skilled persons may recognize a limitation of the above disclosed method. The limitation is related to bar code symbols of such poor quality that a valid decode does not result, even if a number of scans are made of the symbol while in the field of view of a scanner unit. In this instance, the bar code symbol will not only be 'missed', it will omitted from the results determined for the succession of bar code symbols being evaluated. It should be noted that often verifying apparatus, including those that utilize the method of the present invention, are employed to determine when the quality of bar code symbols being printed have dropped to a minimal level of quality. Usually, when this occurs the symbols being printed are still decodable. In addition, an advanced and aggressive decode algorithm may be employed to partially process each scan taken to determine if the symbol is within the field of view of the scanner unit. The approach of using aggressive decode algorithms is discussed in section 3.5.5 of the UCC quality specification. If this approach is utilized each scan would be evaluated for a valid decode twice—once to determine if the symbol is still in the field of view of the scanner and a second using a generic or standardized decode algorithm. Another possible approach that may be utilized to detect missed symbols, for example should a means disposing bar code symbols on the substrate 20 fail, would be to sound an alarm if a valid decode is not detected for a predefined temporal period/interval. As an example, if a valid decode is determined to occur every 50 to 70 milli-seconds, if no symbols are detected for, say, 300 milli-seconds, an alarm means may be activated. The term alarm means may be assumed to include any means whereby an intended individual (or system) is notified of the expiration of the predefined temporal period without a symbol being detected.

Yet another alternate solution to detect missed bar code symbols will now be presented. Referring again to FIGS. 2A and 2B, there is illustrated several means which may be employed to detect a region of substrate 20 wherein a bar code symbol, as depicted in FIG. 2A, or a plurality of symbols, as depicted in FIG. 2B, are known to be disposed. Eye mark 30 is a type of delimitation means known in the art for indicating delimitations between repeating regions, or repeating images, when disposing (e.g. printing) information on a moving substrate. The eye mark, which is essentially a small area of low reflectivity, is detected by a properly arranged eye mark sensor or sensor means. The detection of an eye mark is therefore useful to establish a delimitation of regions wherein one or more bar code symbol are disposed. The previously disclosed methods would then be employed to 'find' and evaluate the actual bar code symbol or symbols within the delimited region. However, if a bar code will not decode properly, it will not be 'missed'. If no valid decodes are detected between eye marks, the bar code symbol or symbols may be assigned a measure of quality indicative of a poor and unacceptable level of quality. For example, if using the UCC quality specification, a bar code symbol which is not decodable is assigned a measure of quality equal to zero (0) and further assigned a weighted value of 'F'. As skilled persons will note, the delimitation means of the present invention are not employed to simply start a scanner to generate a 'decode' to determine the encoded value for the scanned indicia. Instead, with the present invention the scanner is started relative to the location of the delimitation means, so as to initiate scanning, typically just before the bar code symbol enters the field of view of the scanner unit, in order to collect and group a plurality of scans thereof, which are employable to evaluate the quality of the scanned symbol.

In addition, it must be clear that once a delimitation is detected, for example, the top most eye mark 30 in FIG. 2B, scanning may be initiated to scan one or more bar code symbols, but not necessarily the next respective bar code symbol following the delimitation. That is, once a delimitation is detected, one or more bar code symbols may be skipped before scanning activities commence, and a valid decode is detected. Further, as indicated previously, the use of eye marks and an eye mark sensing means enable 'regions' to be detected, even when a bar code symbol is of such poor quality that it is completely undecodable. However, although an eye mark (or the like) may be detected before and or after a bar code is decoded, under certain conditions, an eye mark may be detected during the collecting and grouping of scans. When scanning a region, if an eye mark is detected before a bar code symbol is detected, the detection of the eye mark may be assumed to indicate that the region has ended, and the region did not contain a decodable (i.e., readable) bar code symbol. Alternately, if an eye mark is detected after or while a bar code symbol is being scanned, no further action may be required as a result of the detecting of the eye mark.

Turning again to FIGS. 2A and 2B, there is illustrated an alternate means which may be employed to detect a region of substrate 20 wherein a bar code symbol is known to be disposed. Indexing notch 32 may be positioned, in the same manner as an eye mark 30, to delimit repeating regions of a moving substrate. The indexing notch 32 would be sensed by a suitable mechanical or optical means to determine the start of a region having one or more bar code symbols disposed therein.

For each of the previous methods discussed to delimit a region of the substrate, a mark or index must be placed at the location of the delimitation. For a given application this may be impractical or impossible. An alternate method that may be employed to delimit successive regions of a substrate moving though an apparatus such a printing press incorporates the use of proximity switches, or the like, to count the rotation of gear teeth, for example, on an impression roller. Thus, a count is maintained and checked to determine when the value of the count reaches some predefined value indicative of the start (and/or end) of a region or image. There are several advantages of this approach. First, obviously no marks or indexes need to be physically placed on the moving substrate. Second, the monitoring of the gear teeth count value may be refined to actually indicate a specific portion of the delimited region wherein the bar code symbol is known to be located. One skilled in the art will appreciated the number of variations that may be utilized by monitoring the gear teeth count values. Consider one simple example of the use of counting gear teeth for delimitation purposes. Assume it is known that a bar code symbol has a printed height equivalent to the rotation of 10 gear teeth and the start of a new image (i.e. one full revolution of the impression cylinder) occurs at some known count interval. Therefore, the scanning of a region is started, or scheduled to start, by the determination of a particular count value (or modulus of a count value) and subsequently a 'search' begins to determine a valid decode. Once a valid decode is determined, the next series of scans that occur within, say the next 8 increments of the gear teeth count (from the count of the initial symbol detection), may be assumed to be scans which occur on the bar code symbol. The scanner may then be de-energized in accordance with the 'controlled manner' of the invention. A number of variations using known means to count gear teeth of printing press cylinders, or generally to assess the rotation of an impression roller (or the like) may be provided by skilled persons and are considered as being within the scope of the present invention.

If the method of the invention includes additional steps to maintain a count of the number of bar code symbols scanned, and possibly the number of regions scanned, a variety of numerical statistics may be determined and used to inform an operator of the level of quality of bar code symbols being disposed on a continuous and moving substrate. One skilled in the art will appreciate the types of numerical statistics, and the like, which may be determined from data such as the number of symbols assigned to each of a plurality of measures of quality (or the corresponding weighted values), when considered with the number of symbols and regions scanned.

Several examples of numerical statistics will be briefly discussed for completeness and clarity. As each bar code is detected and evaluated, a count of the total number of bar codes, and possibly delimited regions, may be maintained. In addition, counts of the number of bar codes assigned a specific measure of quality or weighted value may be maintained. Therefore, if the count of the total number of symbols detected is divided into the count of the number of bar code symbols having a particular weighted value, a percentage of symbols assigned to that weighted value may be determined. Similarly, if the count of the total number of symbols detected is divided into the counts of the number of bar codes assigned to each weighted value of the plurality of weighted values, one can determine a plurality of percentages, each percentage determined indicating the percentage of symbols assigned to each weighted value with respect to the total number of symbols detected and processed. If a means is provided to count the total number of regions (or delimitations between bar codes) then the above percentages may also (or alternately) be determined based on the total number of regions detected, and not on the total number of symbols scanned. It should be understood that the percentages determined may be compared to predefined maximum percentages. Accordingly, if a percentage is determined and found to exceed a predefined maximum percentage, an alarm means or beacon may be activated.

The analysis of the data collected as discussed above, may be further grouped into predefined, or possibly dynamically determinable evaluation intervals. The use of evaluation intervals may be helpful to determine trends in the level of relative quality of bar code symbols, and indicate to an operator when a problem is developing. In particular, the use of time intervals (which may be termed evaluation intervals) and quantity intervals may be employed to clearly indicate if the relative quality of bar code symbols being printed is increasing or decreasing. For example, assume the weighted values of A, B, and C are used to evaluate bar code symbols, and are determined for a first time interval equal to the last minute and a second time interval equal to the last 5 minutes. Further, assume the evaluation results for a group of recently printed bar code symbols are summarized as follows: First interval, A=4, B=5 and C=8; Second interval, A=50, B=25, C=10. It would be obvious to an operator that a problem is developing with the quality of the symbols printed based on a comparison of the two intervals. Similarly, intervals may be defined as comprising a 'rolling window' of the last, say, 100 symbols printed. This rolling window (of the last 100) symbols may be compared to a rolling window of, say, the last 10 printed symbols to determine a trend in the quality of the symbols being printed.

One skilled in the art of numerical statistics and numerical analysis will appreciate the variety numerical information that may be produced by utilizing counts such as the number of bar code symbols and regions scanned, and the number of bar codes assigned particular measures of quality or particular weighted values. It should, therefore, be noted that the above examples are meant of be illustrative only.

Figure 5:
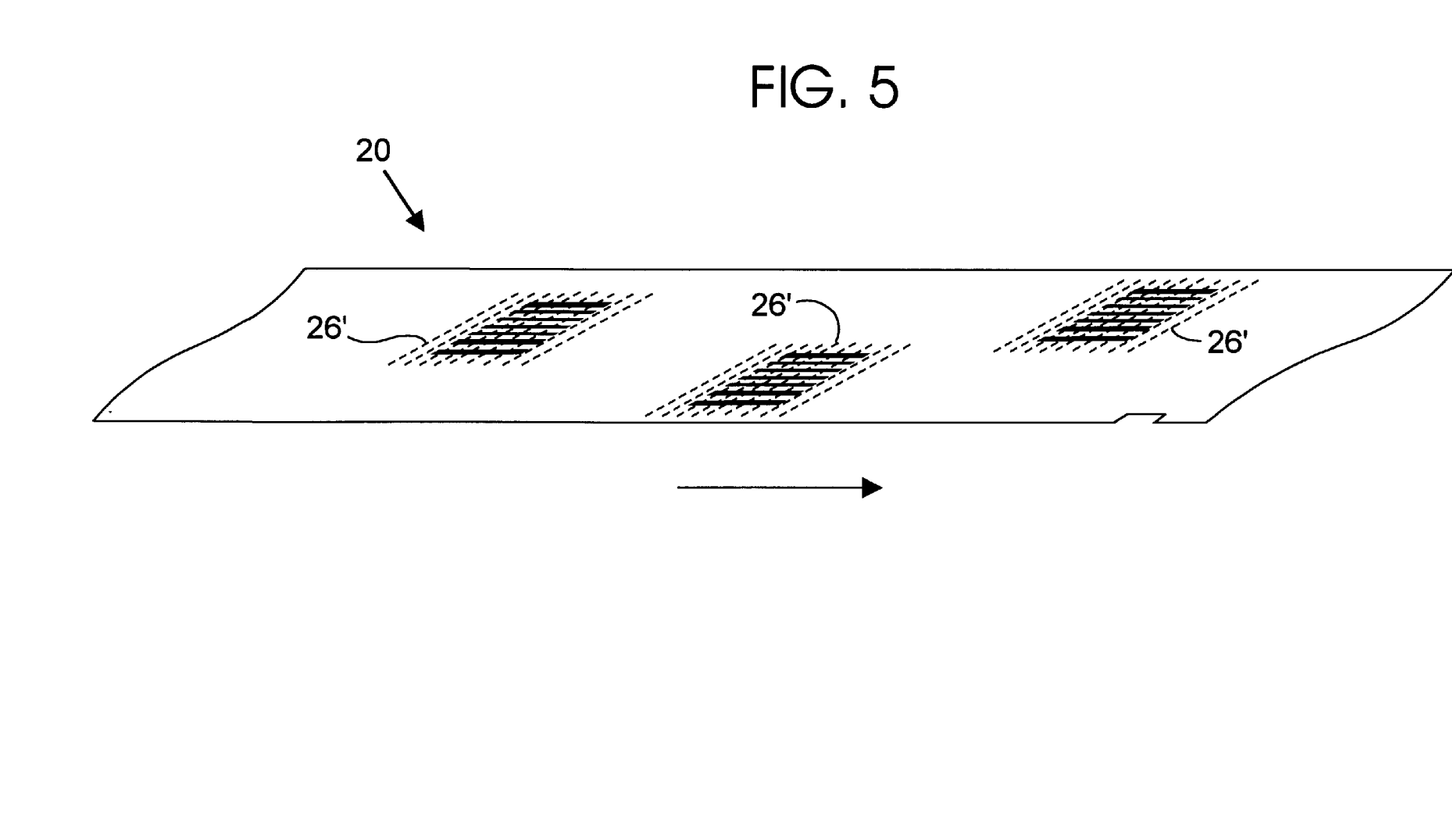
FIG. 5 depicts the grouping of scans associated with each of a succession of bar code symbols disposed on the moving substrate.

Referring again to FIG. 4, scanning during the period from t(0) through t(1) will result in unneeded scans being attempted. As shown in FIG. 5, each bar code symbol disposed on the substrate 20, may be scanned a plurality of times, with unneeded or extraneous scans being minimized. However, in a preferred embodiment of the invention, if scanning is commenced and the first decode were to be found to provide a valid decode, it may be desirable to commence the scanning of the next symbol at an earlier time to insure the required (minimal) plurality of scans are indeed collected and grouped. For example, a temporal period may be required to elapse before, the scanning is restarted or re-commenced. If necessary, the temporal period may be decreased in order to re-commence the scanning at an earlier time to assure scanning occurs, for example, just before the bar code symbol to be scanned enters the field of view of the scanner. Similarly, if a predetermined number of non-decodable scans should occur before a respective symbol enters the field of view of the scanner (and a valid decode occurs), the temporal period may be increased to reduce or trim the number of unusable and non-decodable scans. This will maximize the temporal period that the scanner unit is not scanning, which may extend or increase the useful operating life of the scanner. Accordingly, the dotted scan lines 26', as depicted in FIG. 5, are illustrative of a preferred 'controlled' scanning arrangement as provided by the present invention.

Figure 6:
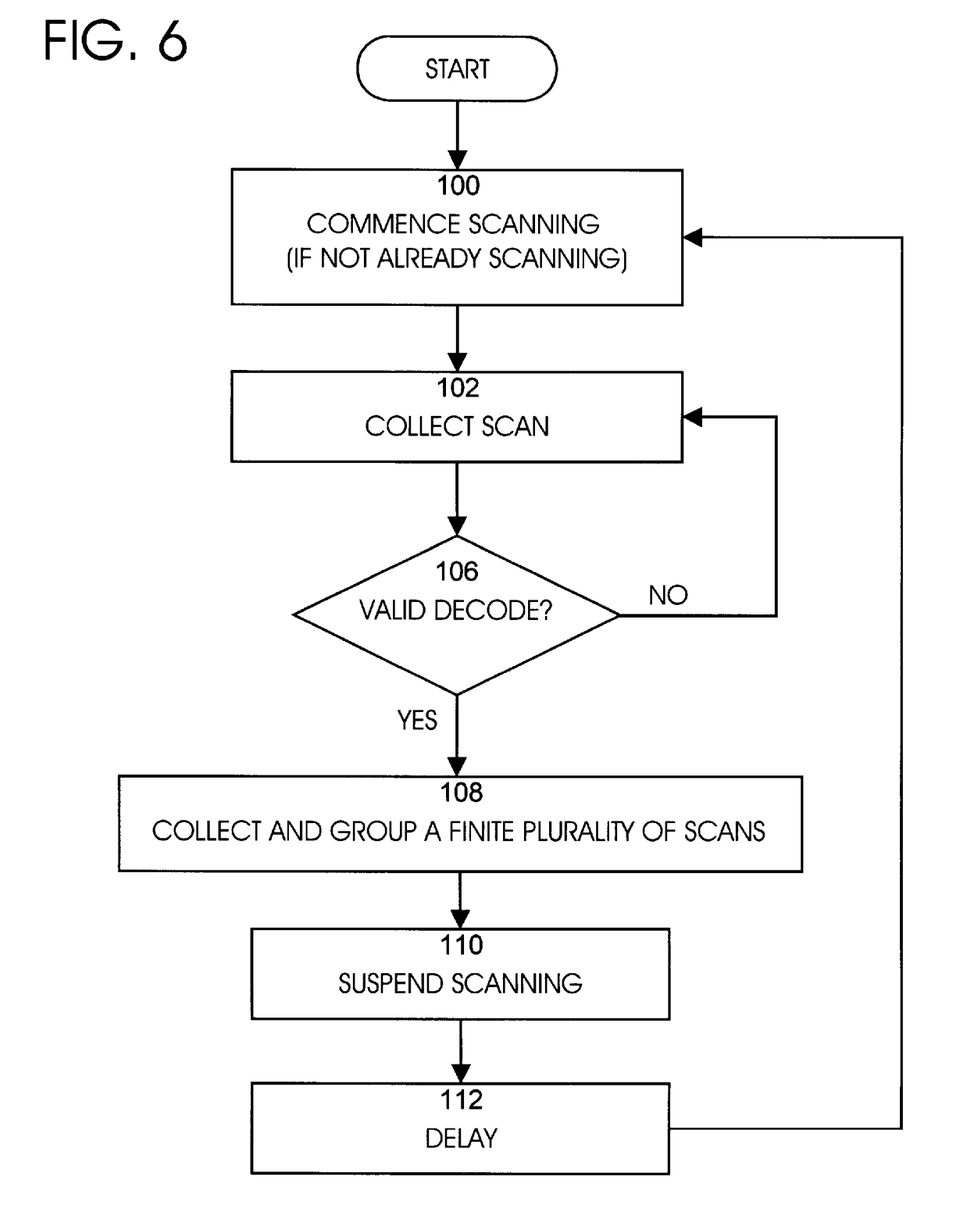
FIG. 6 provides a high level flowchart providing important features of the embodiments of the methods of the present invention.

Referring to FIG. 6 there is provided therein a high level flowchart of an embodiment for scanning in a controlled manner.

As can be seen, scanning commences at 100 (if scanning had not been started or re-started previously). A scan is collected, or attempted, at 102 in order to determine a valid decode. If a valid decode does not occur, as checked at 106, additional scans are attempted until a valid decode occurs. It should be noted that a 'time-out' feature may also be provided within the loop comprised of 102 and 106 should a valid decode not occur within a predefined temporal interval/period. Once a valid decode is determined, a plurality of scans are collected at 108, and possibly processed. It should be noted that the actual number of scans collected at 108 may be established by scanning for a predefined temporal period. Regardless of the particular approach employed, a finite number of scans will be collected at 108, with scanning being suspended at 110. A temporal delay may then be provided at 112, and the process repeated (as desired), with scanning recommencing at 100. It must be understood that FIG. 6 may also be modified, as skilled individuals will appreciate, to include and employ delimitation means to assist in energizing and de-energizing the scanner unit.

While there have been described the currently preferred embodiments of the present invention, those skilled in the art will recognize that other and further modifications may be made without departing from the invention and it is intended to claim all modifications and variations as fall within the scope of the invention and the appended claims.

What is claimed is:

1. A method of scanning a succession of spaced bar code symbols in a controlled manner, the bar code symbols disposed on a moving substrate moving past a scanner unit, the method comprising the steps of:
    a) scanning the moving substrate in the controlled manner so as to ensure a scanner unit is energized and scanning when a respective bar code symbol enters the field of view of the scanner unit and provides a valid decode;
    b) collecting and grouping a plurality of scans associated with the detected and scanned bar code symbol;
    c) de-energizing the scanner unit in accordance with the controlled manner; and
    Repeating steps a), b), and c), for a plurality of bar code symbol of the succession.

2. The method according to claim 1, wherein the scanner is de-energized in step c) after a predetermined number of consecutive non-decodable scans occur for a respective symbol being scanned.

3. The method according to claim 1, with the scanner unit energized and de-energized in accordance with the controlled manner, wherein the scanner unit scans respective bar code symbols for a first predefined temporal period after the first valid decode is detected, and is then de-energized, with scanning resuming after a second predefined temporal period has elapsed.

4. The method according to claim 3, wherein the second temporal period may be decreased if the first scan after re-energizing the scanner unit provides a valid decode.

5. The method according to claim 3, wherein the first temporal period is decreased should a predetermined number non-decodable scans occur while a respective bar code symbol is being scanned, possibly indicating the scanner unit is scanning after the symbol has past the scanner unit.

6. The method according to claim 3, wherein an overall measure of quality is determined for each scanned bar code symbol, with the measure of quality determined by processing at least one scan from the group of scans collected for each respective bar code symbol that is scanned.

7. The method according to claim 1, wherein an alarm means is activated if a valid decode is not detected within a third predefined temporal period.

8. A method to collect and group a plurality of scans associated with each of a plurality of spaced bar code symbols being scanned in succession in a controlled manner, the spaced bar code symbols disposed on a moving substrate having a plurality of repeating regions arranged to move past, and be scanned by, a suitably positioned scanner unit, the method comprising the steps of:
    a) detecting the start of a respective region of the moving substrate having a bar code symbol disposed therein;
    b) commencing scanning, if not already scanning, to detect bar code symbols disposed within the region of the substrate by determining a valid decode, the scanning commencing at a suitable point in time, including one of:
        i) at the detecting of the start of a respective region; and
        ii) once the start of a respective region is determined and a first predefined temporal period has elapsed;
    c) doing one of the following:
        i) detecting the entry of a bar code symbol in the field of view of the scanner unit by scanning the symbol and determining a valid decode, and continuing to step d; and
        ii) detecting the start of the next adjacent region, wherein the scanner unit may be de-energized, and continuing to step b);
    d) collecting the first decoded scan and a plurality of subsequent scans associated of the bar code symbol;
    e) de-energizing the scanner unit in accordance with the controlled manner; and
    f) Repeating steps a) through e), as required, for a plurality of the bar code symbols disposed on the substrate within the regions in order to collect and group a plurality of scans for each respective bar code symbol detected.

9. The method according to claim 8, wherein the scanner unit is de-energized in step e) with the occurrence of one of:
    (a) a predetermined number of consecutive non-decodable scans;
    (b) a predetermined number of consecutive decodable scans;
    (c) a predetermined total number of decodable and non-decodable scans; and
    (d) the expiration of a second predefined temporal period.

10. The method according to claim 9, wherein the first temporal period is increased should a predetermined number of non-decodable scans occur before a respective bar code symbol enters the field of view of the scanner unit and a valid decode is determined.

11. The method according to claim 9, wherein the first temporal period is decreased if the first scan after re-energizing the scanner unit provides a valid decode.

12. The method according to claim 8, wherein the scanner unit may be de-energized and a suitable alarm sounded if a predetermined number regions are scanned without a valid decode being determined.

13. The method according to claim 8, wherein the detection of the start of a region having at least one bar code symbol disposed therein is provided by an eye mark sensor operative to detect the presence of spaced eye marks disposed on the moving substrate, the eye marks being repeated and disposed in a suitable position with respect to each associated region.

14. The method according to claim 8, wherein the detection of a start of a region of the substrate having a bar code symbol printed therein on a printing press, is provided by a method of counting, in an automated manner, gear teeth of a gear wheel of an impression cylinder of the printing press, the method of counting gear teeth to detect delimitations between two adjacent regions comprising the steps of:
    a) determining an initial gear teeth count value;
    b) incrementing the count value when a gear tooth is rotated past a fixed reference location adjacent to the gear wheel of the impression cylinder, a change in the count value indicating a partial rotation of the impression cylinder;
    c) detecting a delimitation between regions when the count value equals a predetermined count value, the predetermined count value indicative of the position of at least one region relative to the scanner unit;

d) evaluating the count value to determine if the change from the initial count value determined in step a) indicates one full revolution of the impression cylinder; and e) doing one of the following:
   i) if the count value determined in step d) indicates one full revolution of the impression cylinder, continuing to step a; and
   ii) if the count value determined in step d) is not indicative one full revolution of the impression cylinder, continuing to step b.

15. The method according to claim 8, wherein a plurality of the scans collected and grouped for each scanned bar code symbol are processed to determine at least one evaluation attribute.

16. A method for detecting, processing, and grouping, a plurality of scans for each scanned bar code symbol in a succession of spaced bar code symbols, the succession of bar code symbols disposed on a substrate moving past at least one scanner unit arranged to scan the substrate in a controlled manner, the method comprising the steps of:

a) scanning the moving substrate in a controlled manner, so as to ensure the scanner unit is operating and scanning when a respective bar code symbol enters the field of view of the scanner unit;
   b) detecting the presence of a bar code symbol moving into the field of view of the scanner unit by scanning the symbol and determining a valid decode;
   c) processing a plurality of subsequent scans, which may include decodable and non-decodable scans of the bar code symbol, to determine at least one evaluation attribute for each scan processed;
   d) de-energizing the scanner unit in accordance with the controlled manner; and
   e) Repeating steps a), b), c), and d) for a plurality of the bar code symbols disposed on the substrate in order to process and group a plurality of scans for each respective bar code symbol detected.

17. The method according to claim 16, wherein the scanner unit is energized and de-energized, in accordance with the controlled manner, by de-energizing the scanner unit for a predefined temporal period after a predetermined number of scans are processed for a respective bar code symbol, and re-energized to resume scanning after the temporal period has elapsed and just before a next respective symbol to be scanned enters the field of view of the scanner unit.

18. The method according to claim 17, wherein the temporal period may be altered in accordance with one of the following:
   a) decreasing the temporal period if the first scan after re-energizing the scanner unit provides a valid decode; and
   b) increasing the temporal period if a predetermined number of non-decodable scans are attempted before a respective bar-code symbol enters the field of view of the scanner unit and a valid decode is determined.

19. The method according to claim 16, wherein the scanner unit scans a respective bar code symbol for a first predefined temporal period after the first valid decode to process and group the plurality of scans, and is then de-energized, with scanning resuming after a second predefined temporal period has elapsed.

20. The method according to claim 19, wherein the second temporal period may be decreased if the first scan after re-energizing the scanner unit provides a valid decode.

21. The method according to claim 20, wherein the first temporal period is decreased should a predetermined number non-decodable scans occur while a respective bar-code symbol is being scanned.

22. The method according to claim 19, wherein an alarm is sounded if a valid decode is not detected within a third predefined temporal period.

23. The method according to claim 19, additionally comprising the step of assigning a measure of quality to each evaluation attribute determined for each scan processed.

24. The method according to claim 23, wherein the measure of quality assigned each evaluation attribute of each scan of a group of scans associated with a respective bar code symbol is combined to determine an overall measure of quality for each bar code symbol scanned.

25. The method according to claim 24, wherein the overall measure of quality determined for a bar code symbol scanned is assigned a particular weighted value selected from a predetermined plurality of weighted values, the weighted value indicative of the relative quality of the bar code symbol.

26. The method according to claim 25, further comprising the step of maintaining a count of the total number of bar code symbols that are detected entering the field of view of the scanner unit during a selected evaluation interval.

27. The method according to claim 26, wherein a count of the number of bar code symbols assigned to each weighted value of the plurality of weighted values is maintained during the evaluation interval.

28. The method according to claim 27, wherein the count of the total number of symbols detected during the evaluation interval is divided into the count of the number of bar code symbols having each particular weighted value during the evaluation interval to determine the percentage of symbols assigned to each weighted value of the plurality of weighted values, thereby determining a plurality of percentages indicating the percentage of symbols assigned to each weighted value during the evaluation interval with respect to the total number of symbols detected and processed during the evaluation interval.

29. The method according to claim 28, wherein a alarm means is activated if one of the following occurs:
   a) the percentage of symbols assigned to a particular weighted value exceeds a predefined maximum percentage; and
   b) a numerical sum of percentages of symbols assigned to two or more weighted values exceeds a predetermined maximum total percentage.

* * * * *